United States Patent [19]
Grob et al.

[11] Patent Number: 5,761,204
[45] Date of Patent: Jun. 2, 1998

[54] METHOD AND APPARATUS OF PROVIDING TIME SENSITIVE MESSAGES OVER A VARIABLE DELAY CHANNEL

[75] Inventors: Matthew S. Grob, San Diego; Gadi Karmi, Del Mar, both of Calif.

[73] Assignee: QUALCOMM Incorporated, San Diego, Calif.

[21] Appl. No.: 717,147

[22] Filed: Sep. 20, 1996

Related U.S. Application Data

[60] Continuation of Ser. No. 418,360, Apr. 7, 1995, abandoned, which is a division of Ser. No. 152,158, Nov. 15, 1993, Pat. No. 5,479,475.

[51] Int. Cl.$^6$ ............................... H04Q 7/34; H04J 3/14
[52] U.S. Cl. ................. 370/467; 370/474; 370/522; 375/222
[58] Field of Search ..................... 370/79, 80, 94.2, 370/110.1, 95.1, 85.6, 465, 466, 467, 468, 471, 474, 522, 310; 375/222, 223; 379/59, 61, 62, 96–98; 455/33.1, 33.2; 358/434, 437

[56] References Cited

U.S. PATENT DOCUMENTS

| H1413 | 2/1995 | Gunn | 375/222 |
|---|---|---|---|
| 4,926,448 | 5/1990 | Kraul et al. | 375/222 |
| 5,012,489 | 4/1991 | Burton et al. | 375/222 |
| 5,297,203 | 3/1994 | Rose et al. | 380/9 |
| 5,452,289 | 9/1995 | Sharma et al. | 370/81 |

FOREIGN PATENT DOCUMENTS

| 9101222 | 7/1991 | WIPO. |
|---|---|---|
| 9200942 | 10/1992 | WIPO. |

OTHER PUBLICATIONS

"Towark a North American Standard for Mobile Data Services", *Digital Signal Processing 2*, by Richard A. Dean et al., Jan. 27–32, 1992..

"The GSM System for Mobile Communication", *Lassay–les–Chateaux*, by Mouly M. et al., 1993..

"Layer 2 Operation for Data/Fax", *The Omni International Hotel*, by Ericsson, Mar. 1–5, 1993.

"Data Services Working Paper: Protocol Structure for Data Services, Draft 1", *The Omni International Hotel*, by Richard p. Ejzak, Mar. 4, 1993.

"Burst Discriminator Options for Advanced Services", *The Omni International Hotel*, by Richard P. Ejzak, Mar. 4, 1993.

"Foreword", *Telecommunications Industry Advanced Services*, by async–Data and Fax Services, Jul. 11, 1994.

"Interoperable Wireless Data", *IEEE Communications Magazine*, by David Weissman et al., Feb. 31, 1993, pp. 68–77.

*Primary Examiner*—Chau Nguyen
*Attorney, Agent, or Firm*—Russell B. Miller; Brian S. Edmonston

[57] ABSTRACT

An apparatus and method of providing communications between standard unmodified terminal equipment over a telephone link that includes a digital wireless link. The digital wireless link introduces substantial time variable delay. In order to pass time sensitive messages over the link, time sensitive messages are recognized and translated into time insensitive messages for transmission over the wireless link. The time insensitive messages indicate the information contained in the time sensitive messages and in the timing of the time sensitive messages. At the receiving end, the time insensitive messages are recognized and the time sensitive messages reconstructed with the appropriate timing.

4 Claims, 5 Drawing Sheets

METHOD AND APPARATUS OF PROVIDING TIME SENSITIVE MESSAGES OVER A VARIABLE DELAY CHANNEL

This is a continuation of application Ser. No. 08/418,360 filed Apr. 7, 1995, abandoned, which is a divisional of application Ser. No. 08/152,158, filed Nov. 15, 1993, now U.S. Pat. No. 5,479,475.

BACKGROUND OF THE INVENTION

I. Field of the Invention

The present invention relates to communication. More particularly, the present invention relates to a novel and improved method and apparatus for providing communication over a digital link.

II. Description of the Related Art

A variety of apparatus exists today that use standard telephone networks to convey data from one terminal to another. One of the most common terminals that uses a standard telephone network to convey data is the facsimile (FAX) machine. Like other terminal equipment that use standard telephone networks, a FAX machine uses a modem to translate digital information to audible analog tones for transmission over the telephone network. At the receiving FAX machine, a modem is used to convert the tones back into an estimate of the original digital information sent by the transmitting FAX machine.

With the deployment of cellular and personal communications wireless systems, the end user may wish to connect his terminal equipment to a mobile communications device instead of directly to a land telephone network. However, if the user attempts to send the audible tones produced by a modem over a standard analog FM cellular channel, it is doubtful that he will be successful. In general, the FM cellular channel introduces a substantial amount of noise into the link compared to the standard land telephone network. The additional noise translates into errors in the estimation of the digital information when the signal is converted at the receiving end. The errors on the link can be overcome by constraining communications to very low transmission rates.

If the end user attempts to send the audible tones produced by a modem over a standard digital wireless channel, it is also doubtful that he will be successful. Digital wireless communication equipment typically uses vocoders to convert incoming voice signals into digital bits for transmission over the channel. Vocoders are tailored to sample and compress human voice. Because modem tones differ significantly from human voice, the vocoder can cause noticeable degradation to the modem tones. Also, maximizing the capacity of the system in terms of the number of simultaneous users that can be handled is extremely important in a system using a wireless link. Digitizing modem tones with a vocoder and sending them over the digital wireless link is an inefficient use of the radio channel.

A more efficient, flexible, and reliable transmission means is to provide a mechanism to transmit the digital data over the digital wireless link directly. This configuration presents some unique opportunities to take advantage of the digital link to provide high quality service.

A typical digital wireless link is not an error free channel. To provide error free communication, the wireless link protocol may provide re-transmission of lost or corrupted data. The re-transmissions introduce arbitrary and significant delays in the data. When the time sensitive messages are transmitted over the wireless link, the timing of the signals may be lost thus prohibiting proper communications.

It is therefore the object of the present invention to provide an efficient method and apparatus for communication with standard terminal equipment over a digital wireless link.

It is a further object of the present invention to provide a means of communicating time sensitive information over a variable time delay link.

SUMMARY OF THE INVENTION

The present invention is a novel apparatus and method of providing communications between standard unmodified terminal equipment over a telephone link that includes a digital wireless link. The present invention replaces the standard local modem with a mobile unit capable of digital communications and a base station comprising digital signal processing and a modem and capable of digital communications. The functions of the original local modem are divided among the new elements.

One function of the new elements is to compensate for the time varying delay of the digital wireless link. The new elements recognize time sensitive messages, translate them into time insensitive messages indicating the time sensitive message for transmission over the wireless link. At the receiving end, the time insensitive messages are recognized and the time sensitive messages reconstructed with the appropriate timing.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
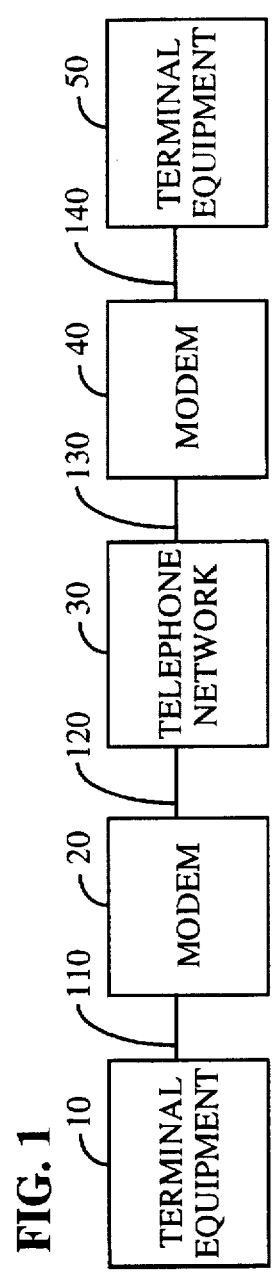
FIG. 1 is an apparatus that uses standard telephone networks to convey data from one terminal to another.

Several methods exist today that use standard telephone networks to convey data from one terminal to another. Terminals that connect by telephone networks can be FAX machines, personal computers, credit card verification machines, and telemetry devices. The standard connection of these type of devices is shown in FIG. 1. For example assume terminal equipment 10 is transmitting information to terminal equipment 50. Terminal equipment 10 produces digital data 110 representative of the information. Modem 20 converts digital data 110 to analog signal 120. Analog signal 120 is of a proper bandwidth and power level to be transferable over standard telephone network 30. Telephone network 30 conveys analog signal 120 to its destination. The telephone network may introduce noise such that output audible signal 130 is an estimate of analog signal 120. Modem 40 converts audible signal 130 to digital data 140 which is an estimate of digital data 110. Terminal equipment 50 receives digital data 140 and can act on an estimate of the information sent by terminal equipment 10. Most such links are bi-directional with the reverse functions working in the same manner as the forward.

FIG. 1 is a simplified diagram. Actual implementations of these connections can take on a variety of forms. For example in some equipment, such as a standard FAX machines, the terminal equipment and the modem reside in the same housing. Also telephone network 30 may use any of a variety of methods well known in the art to convey analog signal 120 to its destination. Such methods may include digitizing the signal and transmitting the signal via satellite to a remote location where audible signal 130 is created.

Figure 2:
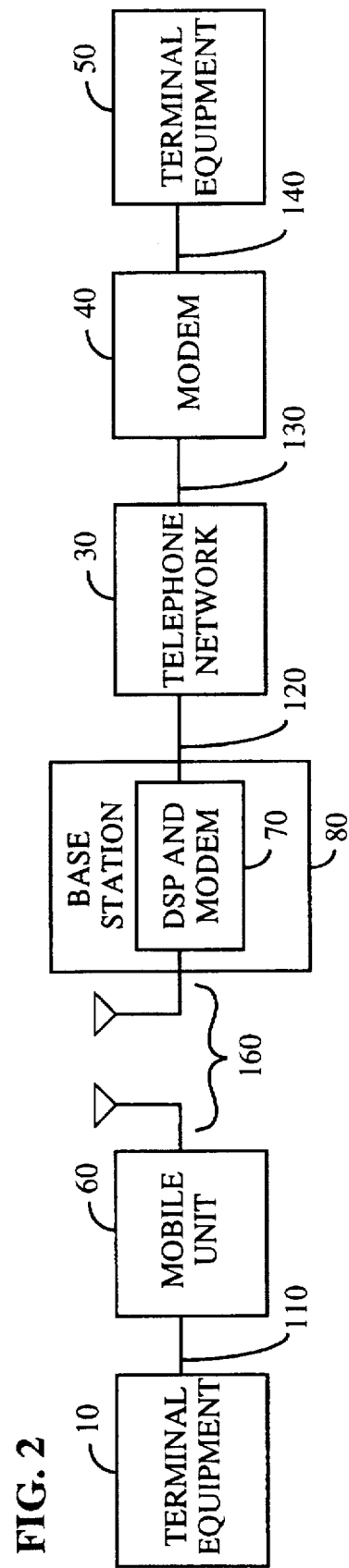
FIG. 2 is an apparatus that uses standard telephone networks and a digital wireless link to convey data from one terminal to another.

A wireless link is introduced into the configuration of FIG. 1 when a user would like to connect his terminal equipment but does not have access to a land telephone network. The user may instead have a digital mobile communications device. FIG. 2 is an exemplary embodiment of such a configuration. In FIG. 2, modem 20 has been replaced with mobile unit 60, wireless link 160, and digital signal processor (DSP) and modem 70. DSP and modem 70 "which can be called a telephone modem apparatus" resides in base station 80 which could be a standard cellular or personal communications base station also capable of handling digital and analog voice communications. FIG. 2 assumes that just one of the connections has been replaced with a wireless link. The description that follows applies equally if communication is achieved with two wireless links.

Referring to FIG. 2, assume again that terminal equipment 10 is transmitting information to terminal equipment 50. Terminal equipment 10 produces digital data 110 representative of the information. Mobile unit 60 modulates digital data 110 and provides output over wireless link 160. The signal from wireless link 160 is received by base station 80 and DSP and modem 70. DSP and modem 70 converts the digital signal to analog signal 120 which is the same signal output by modem 20 in FIG. 1. Telephone network 30 conveys analog signal 120 to its destination. Telephone network 30 may introduce noise such that output audible signal 130 is an estimate of analog signal 120. Modem 40 converts audible signal 130 to digital data 140 which is an estimate of digital data 110. Terminal equipment 50 receives digital data 140 and can act on an estimate of the information sent by terminal equipment 10. This link is bi-directional with the reverse functions working in the same manner as the forward.

Figure 3:
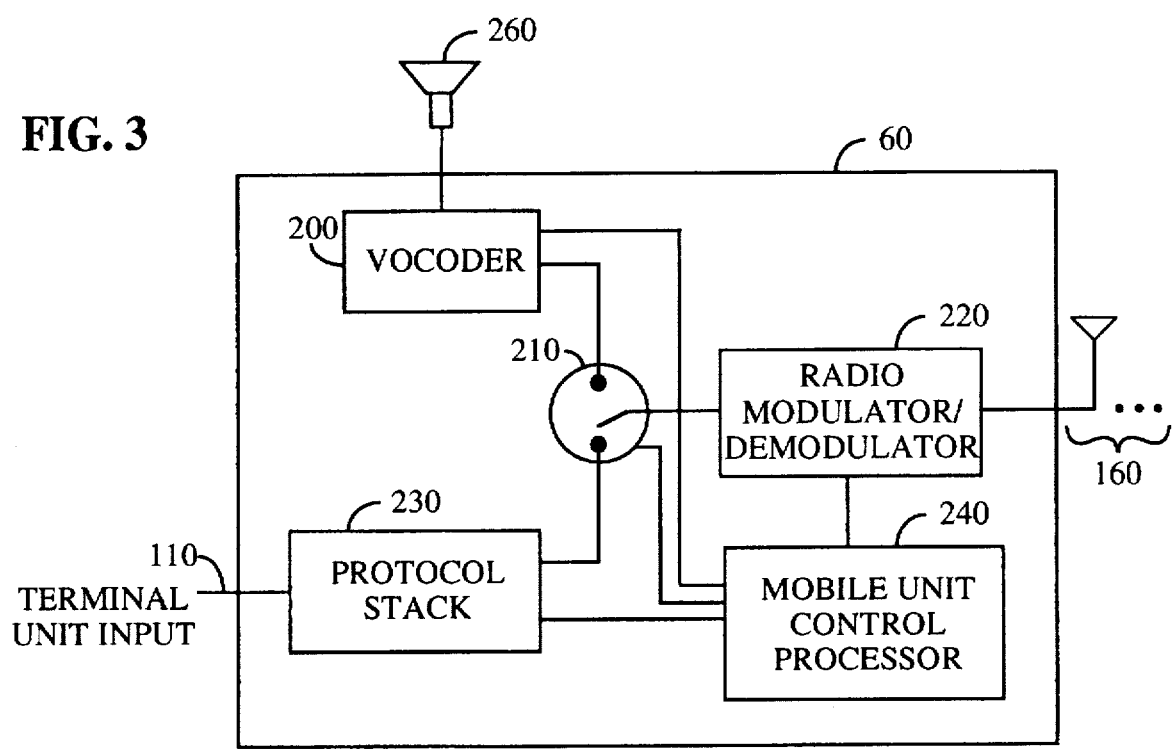
FIG. 3 is a detailed representation of an exemplary configuration of a mobile unit used to connect terminal equipment to a telephone network.

Because in FIG. 2 modem 20 has been replaced with mobile unit 60, wireless link 160, and DSP and modem 70, a new partitioning of the functions of modem 20 is necessary. In addition, some new commands and new functionality are necessary to use the wireless link. Ideally this new functionality should operate independent of the terminal equipment so that no modification of the terminal equipment is necessary to support the wireless link. FIG. 3 provides a more detailed representation of an exemplary configuration of mobile unit 60. In FIG. 3, mobile unit 60 is assumed to be a mobile telephone that provides both voice and data capabilities. In an alternative embodiment, mobile unit 60 might be a dedicated single use mobile unit.

In FIG. 3, digital data 110 is connected to protocol stack 230 within mobile unit 60. Protocol stack 230 is capable of bi-directional communication with terminal equipment 10, mobile unit control processor 240 and radio modulator/demodulator 220. When protocol stack 230 receives digital data 110 for transmission over wireless link 160, it provides any required encoding and passes the encoded information to radio modulator/demodulator 220 through switch 210. Radio modulator/demodulator 220 modulates the encoded information and provides the signal for transmission to wireless link 160. Inversely, when a signal containing information for terminal equipment 10 arrives, radio modulator/demodulator 220 demodulates the signal and provides it to protocol stack 230 through switch 210.

Likewise when vocoder 200 receives analog information from speaker/microphone 260 for transmission over wireless link 160, it encodes the information and passes the encoded information to radio modulator/demodulator 220 through switch 210. Radio modulator/demodulator 220 modulates the encoded information and provides the signal for transmission to wireless link 160. When a signal containing information for output on speaker/microphone 260 arrives on wireless link 160, modulator/demodulator 220 demodulates the signal and provides it to vocoder 200 through switch 210. Vocoder 200 decodes the signal and provides audible output to speaker/microphone 260.

Mobile unit control processor 240 provides control over the functions of mobile unit 60. Information intended for mobile unit control processor 240 might come either over wireless link 160 or from digital data 110. Protocol stack 230 directs information intended for mobile unit control processor 240 to it and receives commands and information for transmission from mobile unit control processor 240. Mobile unit control processor 240 also provides control functions for vocoder 200, switch 210, and radio modulator/demodulator 220.

Protocol stack 230 provides the main control center for communication with terminal equipment 10 over the wireless link. Protocol stack 230 must recognize and operate under a variety of protocols. For instance, digital data 110 may use a different format or protocol from the wireless link. Standard voice wireless connections do not provide the error free communication that is necessary for data transfer. Protocol stack 230 can provide a mechanism of error detection and error correction of both link directions.

Protocol stack 230 may need to provide flow control. Digital data 110 may have a data rate that is higher than that of which wireless link 160 is capable. In this case protocol stack 230 may store the excess data and recall data at a rate appropriate for output on the link. The inverse situation could also be true that wireless link 160 is capable of operating at a higher data rate than terminal equipment 10 is capable of receiving. Protocol stack 230 may be capable of commanding the higher rate transmitting device to pause the flow of data.

Protocol stack 230 also packetizes and unpacketizes data. Typically digital data 110 provided by terminal equipment 10 is a steady stream of characters. Typically wireless link 160 is packetized meaning that certain bits of information are grouped together for processing and transmission. A group of data is called a frame. Frames aid in error detection and correction. Protocol stack 230 must packetize digital data 110 provided by terminal equipment 10 into frames for radio modulator/demodulator 220 and unpacketize frames from radio modulator/demodulator 220 for digital data 110.

Protocol stack 230 must also recognize an array of special commands. Referring again to FIGS. 1 and 2, terminal equipment 10 can produce several categories of output.

Terminal equipment 10 can produce information for transfer to terminal equipment 50. Terminal equipment 10 can produce commands for modem 20 which are not to be transferred to terminal equipment 50. Terminal equipment 10 can also produce commands for modem 40 which are not to be transferred to terminal equipment 50. Because in FIG. 2, modem 20 of FIG. 1 has been replaced with mobile unit 60, wireless link 160, and DSP and modem 70, if terminal equipment sends a message intended for the local modem the message must be sent over wireless link 160. If the command intended for the local modem is related to a function now performed by protocol stack 230, protocol stack 230 must recognize and act upon the command with the aid of mobile unit control processor 240. Protocol stack 230 must autonomously support these functions without additional direction from terminal equipment 10.

One of the challenges of the digital wireless link is that the time delay of the channel is variable. In a standard high capacity digital wireless link, frame error rates of about 1% are common. Using error detection methods, these errors can be corrected. One method to improve the resulting error rate is to provide a retransmission of lost or corrupted frames. Protocol stack 230 supports the retransmission of frames.

Figure 4A:
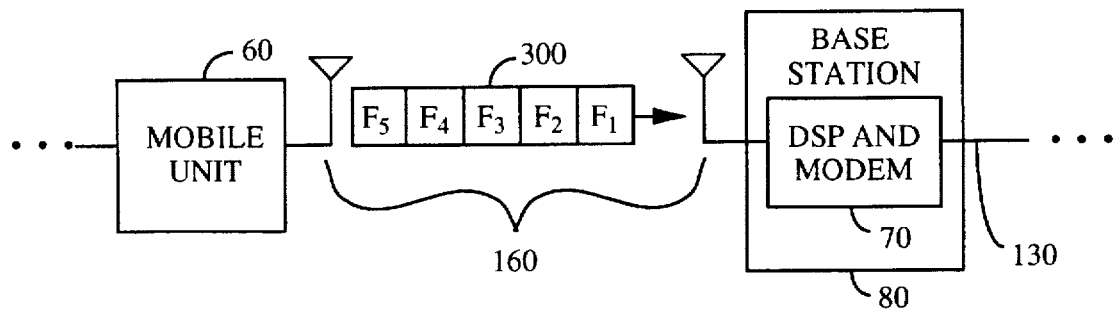
FIGS. 4A–4C illustrate the transmission of five frames of data across a wireless link.
Figure 4B:
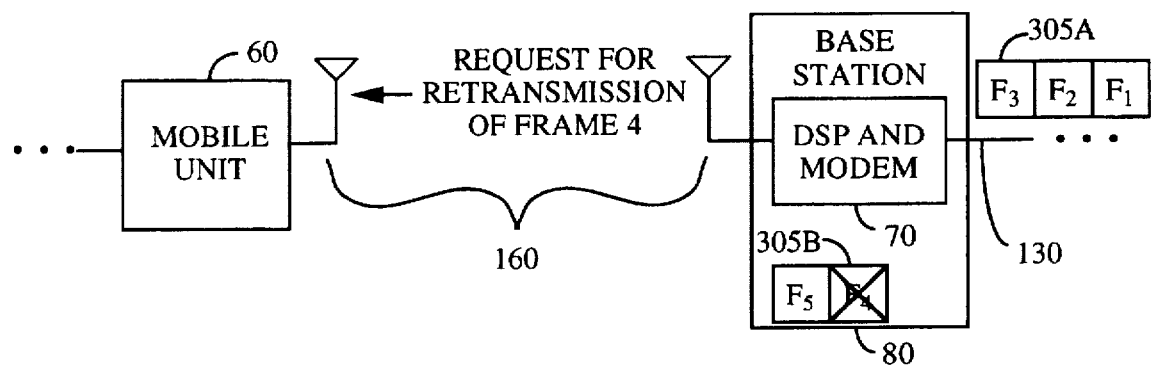
Figure 4C:
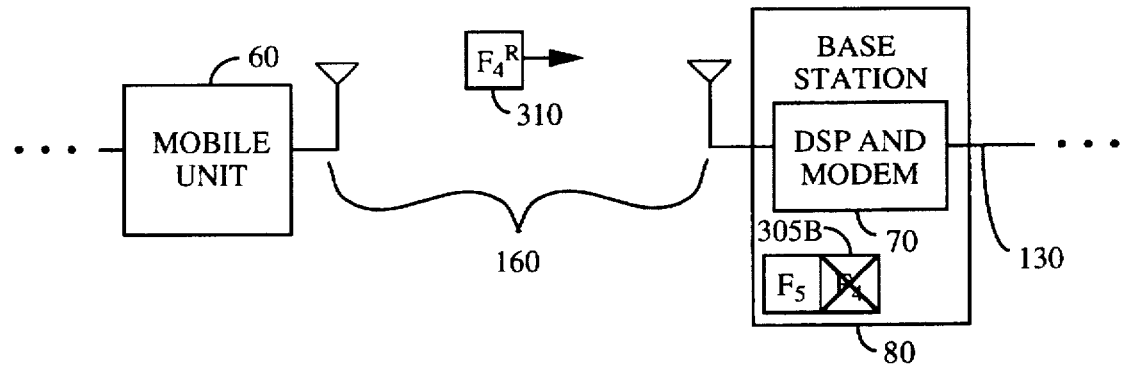

To illustrate the retransmission mechanism, refer again to FIG. 3. Assume that terminal equipment 10 issues a single command consisting of a stream of digital bits. In this example, protocol stack 230 divides the digital bits into five frames of data and passes the five frames to radio modulator/demodulator 220. Radio modulator/demodulator 220 modulates the data and sends the frames over wireless link 160. The transmission of the five frames is illustrated in FIG. 4A. Data stream 300 represents the five frames of data to be sent to DSP and modem 70. In FIG. 4B, an estimate of data stream 300 has been received by DSP and modem 70 and has been recovered as data streams 305A and 305B. Within data stream 305B, frame four has been corrupted and DSP and modem 70 is requesting that mobile unit 60 retransmit frame four. FIG. 4C shows the re-transmission of frame four. In FIG. 4B notice that DSP and modem 70 outputs frames one, two, and three as audible signal 130 before the re-transmitted frame four is received thus introducing a substantial arbitrary delay between frame three and frame four. The corresponding reverse mechanism works in the same manner. This entire process including packetization, flow control, and the transmission and retransmission over the digital wireless link, is highly likely to destroy any timing relation between the data bits coming from terminal equipment 10. Thus, the time variable delay of the link must be overcome to support reliable communications.

The destruction of the timing relationship between data bits coming from terminal equipment 10 can prevent proper communication of time sensitive messages over the link. Standard time sensitive messages include escape, break, voice request for FAX, ring indications, result codes, command termination, and data carrier detection. For example, a time sensitive message might follow a pattern such as one second where no input is made, three consecutive characters at a predetermined spacing, and then another second wherein no input is made. Typically, such messages require timing with precision on the order of a millisecond. Using the example above, 0.99 seconds where no input is made, three consecutive characters at a predetermined spacing, and then another second wherein no input is made would not be recognized as the time sensitive command because 0.99 seconds is 10 milliseconds different than 1 second. The time delay associated with the digital wireless link can exceed 10 milliseconds and thus destroy the information in a time sensitive message.

The present invention resolves this problem by using a special radio link protocol (RLP) to recognize the time sensitive messages. For example referring again to FIG. 3, assume a time sensitive message is received by protocol stack 230 from digital data 110. Protocol stack 230 recognizes time sensitive messages and invokes the radio link protocol. Protocol stack 230, instead of repeating the time sensitive message to radio modulator/demodulator 220, translates the time sensitive message into a special message designating the type of time sensitive message received.

Figure 5:
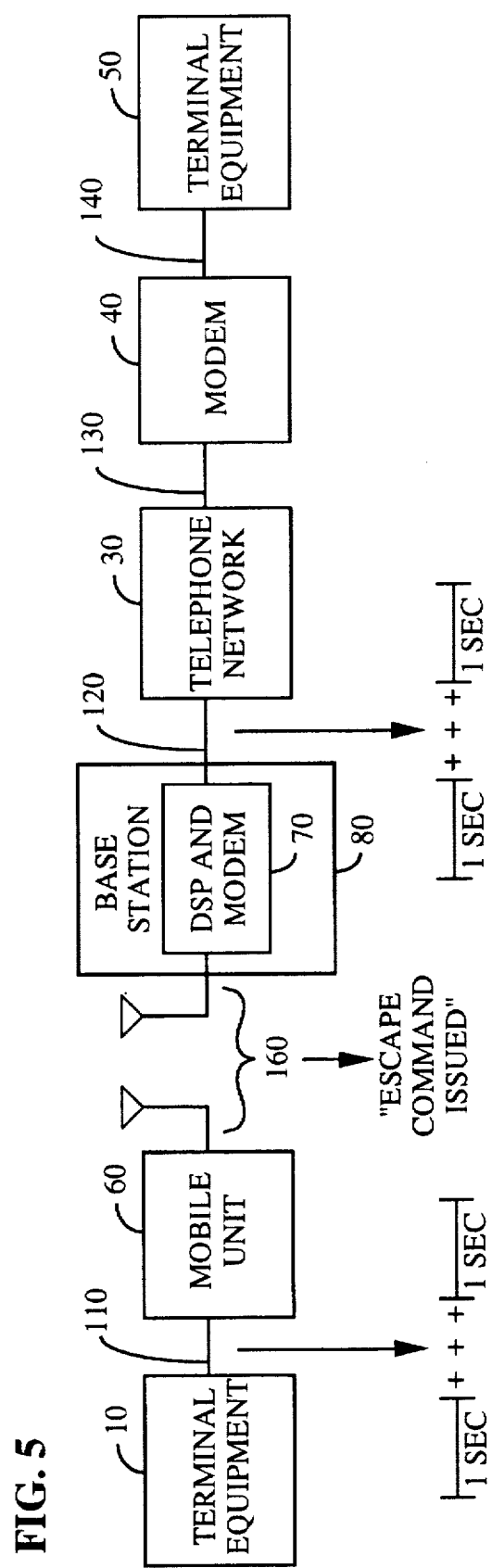
FIG. 5 illustrates the issuance of a special time sensitive escape sequence.

For example refer to FIG. 5. In FIG. 5, terminal equipment 10 has issued a special time sensitive escape sequence. The escape sequence is one second where no input is made, three consecutive "plus" characters at a predetermined spacing, and then another second wherein no input is made. The escape sequence is used to alert the modem that a command or series of commands from the terminal equipment is to follow. The commands are not intended for transfer as data to the receiving terminal equipment and instead are intended for action at the local or receiving modem. The local modem must recognize the escape sequence so that it does not erroneously pass the command as data. If the timing of the escape sequence is destroyed, the modem will not recognize the escape sequence and the subsequent command.

In FIG. 5, assume that the escape sequence is intend for transfer to the receiving modem. Mobile unit 60 has recognized that a time sensitive message has been received and invoked the RLP. Within mobile unit 60, protocol stack 230 translates the time sensitive message into a time insensitive message designating the time sensitive message received. The time insensitive translation, in this case "escape sequence issued," is transmitted over wireless link 160. At base station 80 the time insensitive translation is recognized and reconstructed with the proper timing for transmission as analog signal 120 for action at modem 40. Alternatively, if the escape sequence is solely intended for action by DSP and modem 70, DSP and modem 70 may act upon the message and refrain from re-transmission of the regenerated sequence over analog signal 120. This function operates bi-directionally with the reverse function working in the same manner as the forward.

Base station 80 and DSP and modem 70 provide similar functions to those found in mobile unit 60. Base station 80 receives and provides the radio link signal over wireless link 160 and analog telephone network signal 120 while mobile unit 60 receives and provides radio link signal and terminal equipment signal, digital data 110.

Figure 6:
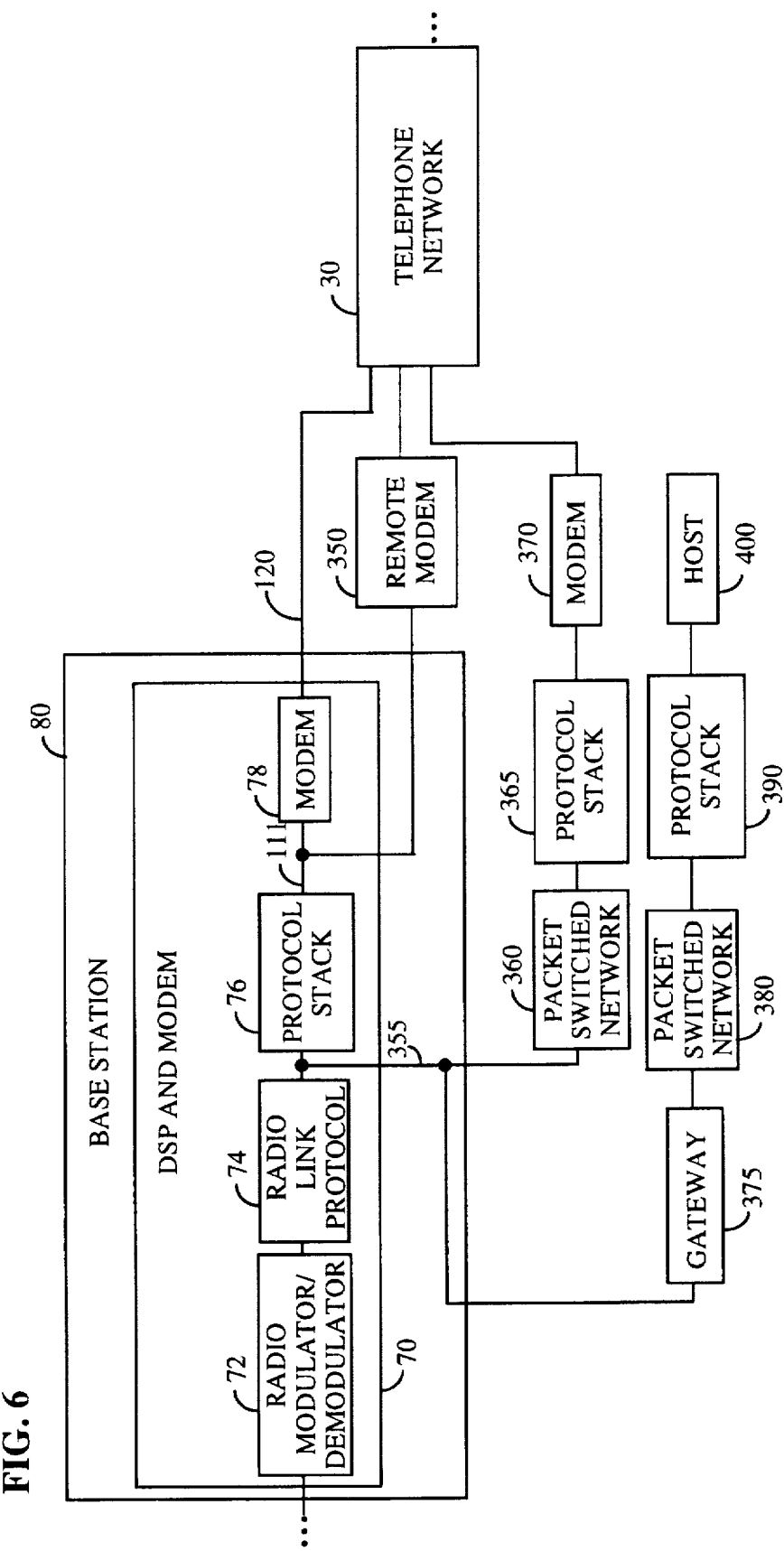
FIG. 6 is a detailed representation of a possible configuration of a base station and also illustrates several alternative configurations for connection to the telephone network.

FIG. 6 illustrates in more detail base station 80. FIG. 6 also illustrates several alternative configurations to the standard configuration discussed thus far. In FIG. 6, DSP and modem 70 is made up of four parts: radio modulator/demodulator 72, radio link protocol 74, protocol stack 76, and modem 78. Radio modulator/demodulator 72 demodulates the incoming signal from wireless link 160 and provides the signal to radio link protocol 74. Radio modulator/demodulator 72 also modulates the outgoing signal from radio link protocol 74 and provides it to wireless link 160.

Together radio link protocol 74 and protocol stack 76 perform similar functions to that of protocol stack 230 in mobile unit 60. Radio link protocol 74 provides functions for wireless link 160 such as supporting re-transmissions for error free communication as discussed in conjunction with FIG. 4.

Protocol stack 76 provides the recognition, packetization, transfer, or translation of commands from modem 78. For example, protocol stack 76 translates any time sensitive messages received from modem 78. Protocol stack 76 provides the depacketization, recognition, transfer, or translation of messages to modem 78 including the recognition and reconstruction of time sensitive messages. Digital data 111 is analogous to digital data 110. Modem 78 receives and produces digital data 111 and communicates analog signal 120 to and from telephone network 30.

The partitioning of DSP and modem 70 shown in FIG. 6 enables a variety of alternative configurations for the base station. The packetized data 355 between radio link protocol 74 and protocol stack 76 is encoded for transmission over the wireless link and is error free in both directions. Packetized data 355 is encoded for transfer over a time variable channel thus if the base station is part of a public network, packetized data 355 may be suitable for direct communication over the network. For example, packetized data 355 can be connected to gateway 375 which provides connection to public packet switched network 380. Generally, packet switched networks also have path delays that are time varying. Thus, the configuration makes good use of the encoded time sensitive messages. Protocol stack 390 performs the same functions protocol stack 76 including the recognition and translation of time sensitive message into time insensitive commands and the recognition and reconstruction time insensitive messages into time sensitive messages. Host 400 may be variety of devices including a server computer, a bulletin board or a modem network.

If the base station is part of a private network, packetized data 355 may be directly communicated on private packet switched network 360 again making good use of the encoded time sensitive messages. Protocol stack 390 performs the same functions as protocol stack 76. Likewise modem 370 provides the same functions as modem 78.

A fourth possible connection communicates digital data 111 to remote modem 350. Remote modem 350 provides the same functions as modem 78 but may not be located within base station 80. This configuration might be used if the data service provider and the wireless service provider are different entities.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of sending timing sensitive digital data over a communication channel having a variable delay, comprising the steps of:

monitoring a stream of digital data;

recognizing a first time sensitive message within said stream of digital data;

substituting a time insensitive message for said first time sensitive message within said stream of digital data to produce modified digital data, said time insensitive message corresponding to an encoded representation of said first time sensitive message wherein said encoded message is insensitive to delay variation in said variable time delay channel;

conveying said modified digital data over said communication channel;

receiving a copy of said modified digital data from said communication channel;

monitoring said copy of said modified digital data for said time insensitive message;

recognizing within said copy of said modified digital data said time insensitive message;

converting said time sensitive message into said first time sensitive message; and substituting said first time sensitive message for said time insensitive message within said copy of said modified digital data to produce a copy of said stream of digital data.

2. The method of claim 1 of sending timing sensitive digital data over a communication channel having a variable delay wherein said communication channel is governed by a protocol which provides for repetition of erroneously received data and wherein said repetition causes said variable delay.

3. The method of claim 1 of sending timing sensitive digital data over a communication channel having a variable delay further comprising the steps of:

converting said copy of said stream of digital data to a plurality of analog tones;

transmitting said plurality of analog tones over a telephone network to a remote location; and converting at said remote location said plurality of analog tones to a second copy of said stream of digital data.

4. A method of sending timing sensitive digital data over time delay variable communication channels, comprising the steps of:

recognizing a first time sensitive message within said stream of digital data;

substituting a time insensitive message for said first time sensitive message within said stream of digital data to produce modified digital data, said time insensitive message corresponding to an encoded representation of said first time sensitive message wherein said encoded representation is insensitive to delay variation in said variable time delay channel;

conveying said modified digital data over a wireless link using a first data format and protocol wherein said use of said first data format and protocol causes a time varying delay within said modified digital data;

receiving a copy said modified digital data from wireless link;

formatting said copy of said modified digital data for interconnection with a pubic packet switched network having a different protocol.

conveying said formatted copy of said modified digital data over said public packet switched network;

recognizing within said formatted copy of said modified digital data said time insensitive message; and converting said formatted copy of said modified digital data and said time insensitive message into a copy of said stream of digital data comprising said first time sensitive message.

* * * * *